(12) United States Patent
Chen et al.

(10) Patent No.: US 12,068,789 B2
(45) Date of Patent: Aug. 20, 2024

(54) CALIBRATION METHOD, APPARATUS AND DEVICE FOR COHERENT OPTICAL MODULE, AND COMPUTER READABLE STORAGE MEDIUM

(71) Applicant: ACCELINK TECHNOLOGIES CO., LTD., Wuhan (CN)

(72) Inventors: Sheng Chen, Wuhan (CN); Hui Zou, Wuhan (CN); Wuping Zhang, Wuhan (CN); Bo Zhang, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/000,115

(22) PCT Filed: Dec. 14, 2020

(86) PCT No.: PCT/CN2020/136232
§ 371 (c)(1),
(2) Date: Nov. 28, 2022

(87) PCT Pub. No.: WO2021/258670
PCT Pub. Date: Dec. 30, 2021

(65) Prior Publication Data
US 2023/0198629 A1 Jun. 22, 2023

(30) Foreign Application Priority Data
Jun. 24, 2020 (CN) .......................... 202010590932.1

(51) Int. Cl.
*H04B 10/61* (2013.01)
*H04B 10/80* (2013.01)
(52) U.S. Cl.
CPC ......... *H04B 10/616* (2013.01); *H04B 10/806* (2013.01)

(58) Field of Classification Search
CPC ............................ H04B 10/615; H04B 10/616
See application file for complete search history.

(56) References Cited

U.S. PATENT DOCUMENTS 10,498,461 B1 * 12/2019 Vera Villarroel ... H03F 3/45475
2013/0343751 A1 12/2013 Mamyshev
(Continued)

FOREIGN PATENT DOCUMENTS

CN 104836613 A 8/2015
CN 105052056 A 11/2015
(Continued)

OTHER PUBLICATIONS

International Search Report issued in International Application No. PCT/CN2020/136232, mailed on Mar. 22, 2021.
(Continued)

*Primary Examiner* — Shi K Li
(74) *Attorney, Agent, or Firm* — Knobbe, Martens, Olson & Bear, LLP

(57) ABSTRACT

Disclosed are a calibration method and apparatus for a coherent light module, and a computer-readable storage medium. The method comprises: obtaining a first and second curve relationship respectively representing a relationship between a power-gain monitoring voltage and optical power of a receiver of the coherent optical module and a relationship between a target setting voltage and the optical power of the receiver in the optical power range of the receiver; determining first optical power based on the first and second curve relationship, which is used for dividing the optical power range of the receiver into two ranges; and determining a calibration mode of the coherent light module based on the first optical power, which comprises: calibrating the coherent light module by using the first curve relationship or
(Continued)

the second curve relationship when the optical power of the receiver is in a first range or in a second range.

15 Claims, 7 Drawing Sheets

(56) References Cited

U.S. PATENT DOCUMENTS

| | | | |
|---|---|---|---|
| 2017/0111109 A1 | 4/2017 | Yamamoto | |
| 2018/0152242 A1* | 5/2018 | Kurisu | H04J 14/02 |
| 2018/0294889 A1* | 10/2018 | Oe | H04B 10/6931 |

FOREIGN PATENT DOCUMENTS

| | | |
|---|---|---|
| CN | 105897346 A | 8/2016 |
| CN | 107547128 A | 1/2018 |
| CN | 109495182 A | 3/2019 |
| CN | 111193551 A | 5/2020 |
| CN | 111814105 A | 10/2020 |
| JP | 2011250373 A | 12/2011 |
| JP | 5604988 B2 | 10/2014 |

OTHER PUBLICATIONS

Search Report issued in Chinese Application No. 2020105909321, dated Mar. 30, 2021.
Supplemental Search Report issued in EP Application No. 20942039, dated Jun. 10, 2024.

* cited by examiner

CALIBRATION METHOD, APPARATUS AND DEVICE FOR COHERENT OPTICAL MODULE, AND COMPUTER READABLE STORAGE MEDIUM

CROSS-REFERENCE

The present disclosure claims the benefit of and priority to Chinese Patent Application No. 202010590932.1 filed on Jun. 24, 2020, the disclosure of which is hereby expressly incorporated by reference herein in its entirety.

TECHNICAL FIELD OF THE DISCLOSURE

Embodiments of the present disclosure relate to the technical field of optical fibers, and in particular, to a calibration method, apparatus, and device for a coherent optical module (Co Op Mo), and a computer-readable storage medium.

BACKGROUND

In a conventional coherent optical module, the total optical power report of a receiving end is generally calibrated by using a photo diode (PD) report. However, for a miniaturized module, it is not spacious enough to accommodate an external tap photo detector (TAP-PD), and PD integrated in a receiver at a receiving end of a module may be used to report and calibrate. For a receiver at a receiving end of a module, some manufacturers may not integrate the internal PD. Under such circumstance, the optical power calibration cannot depend on the PD. How to guarantee to obtain the reporting curve line in the optical power range of the whole receiving end and to improve the reporting precision in the whole optical power range without depending on the PD is a problem which has no effective and available solution currently.

SUMMARY

The main purpose of the present disclosure is to provide a calibration method, apparatus, and device for a coherent optical module, and a computer-readable storage medium, which may solve the foregoing technical problem at least to some extent.

In order to achieve the above purpose, an embodiment of the present disclosure provides a calibration method for a coherent optical module, comprising: obtaining a first curve relationship and a second curve relationship, wherein the first curve relationship represents a relationship between a power-gain monitoring voltage and optical power of a receiver of the coherent optical module in an optical power range of the receiver of the coherent optical module, the power-gain monitoring voltage being used to measure a voltage amplitude output by an integrated coherent receiver of the coherent optical module, and the second curve relationship represents a relationship between a target setting voltage and the optical power of the receiver of the coherent optical module in the optical power range of the receiver of the coherent optical module, the target setting voltage being used for adjusting the voltage amplitude output by the integrated coherent receiver of the coherent optical module; determining first optical power based on the first curve relationship and the second curve relationship, wherein the first optical power is used to divide the optical power range of the receiver of the coherent optical module into two ranges, a first range of which is greater than a lower limit value of the optical power range of the receiver of the coherent optical module and less than the first optical power, and a second range of which is greater than or equal to the first optical power and less than an upper limit value of the optical power range of the receiver of the coherent optical module; determining a calibration mode of the coherent optical module based on the first optical power, wherein the calibration mode comprises: in a case that the optical power of the receiver of the coherent optical module is in the first range, calibrating the coherent optical module by using the first curve relationship; and in a case that the optical power of the receiver of the coherent optical module is in the second range, calibrating the coherent optical module by using the second curve relationship.

In an alternative embodiment of the present disclosure, said calibrating the coherent optical module by using the first curve relationship comprises: obtaining a plurality of groups of first data satisfying the first curve relationship, and performing a fitting process on the plurality of groups of first data to obtain a first calibration function in the first range; and said calibrating the coherent optical module by using the second curve relationship comprises: obtaining a plurality of groups of second data satisfying the second curve relationship, and performing a fitting process on the plurality of groups of second data to obtain a second calibration function in the second range.

In an alternative embodiment of the present disclosure, said obtaining the first curve relationship and the second curve relationship comprises: adjusting optical power of incident light in the optical power of the receiver of the coherent optical module, and performing a light splitting process on each adjusted channel of incident light to obtain first incident light and second incident light corresponding to each channel of incident light, wherein the incident light is a channel of light received by the receiver of the coherent light module; obtaining optical power of the first incident light corresponding to each channel of incident light; obtaining a power-gain monitoring voltage and a target setting voltage of the second incident light corresponding to each channel of incident light; determining the first curve relationship according to the optical power of the first incident light and the power-gain monitoring voltage of the second incident light corresponding to of the same channel of incident light; and determining the second curve relationship according to the optical power of the first incident light and the target setting voltage of the second incident light corresponding to the same channel of incident light.

In an alternative embodiment of the present disclosure, the obtaining the first curve relationship and the second curve relationship comprises: performing an attenuation process on optical power of incident light in the optical power range of the receiver of the coherent optical module, and performing a light splitting process on each attenuated channel of incident light to obtain first incident light and second incident light corresponding to each channel of incident light, wherein the incident light is a channel of light received by the receiver of the coherent light module; obtaining optical power of the first incident light corresponding to each channel of incident light; obtaining a power-gain monitoring voltage and a target setting voltage of the second incident light corresponding to each channel of incident light; determining the first curve relationship according to the optical power of the first incident light and the power-gain monitoring voltage of the second incident light corresponding to the same channel of incident light; and determining the second curve relationship according to the optical power of the first incident light and the target setting voltage of the second incident light corresponding to the same channel of incident light.

In an alternative embodiment of the present disclosure, before obtaining the first curve relationship and the second curve relationship, the method further comprises: performing an initialization process on the coherent optical module, wherein the initialization process comprises: adjusting the optical power of the receiver of the coherent optical module to an upper limit value of the optical power range of the receiver of the coherent optical module.

An embodiment of the present disclosure further provides a calibration apparatus for a coherent optical module, comprising an obtaining unit, a determining unit, and a calibration unit, wherein:

the obtaining unit is configured to obtain a first curve relationship and a second curve relationship, wherein the first curve relationship represents a relationship between a power-gain monitoring voltage and optical power of a receiver of the coherent optical module in an optical power range of the receiver of the coherent optical module, the power-gain monitoring voltage being used for measuring a voltage amplitude output by an integrated coherent receiver of the coherent optical module; and the second curve relationship represents a relationship between a target setting voltage and the optical power of the receiver of the coherent optical module in the optical power range of the receiver of the coherent optical module; the target setting voltage being used for adjusting the voltage amplitude output by the integrated coherent receiver of the coherent optical module;

the determining unit is configured to determine first optical power based on the first curve relationship and the second curve relationship obtained by the obtaining unit, wherein the first optical power is used for dividing the optical power range of the receiver of the coherent optical module into two ranges, wherein a first range of the two ranges is greater than a lower limit value of the optical power range of the receiver of the coherent optical module and less than the first optical power, and a second range of the two ranges is greater than or equal to the first optical power and less than an upper limit value of the optical power range of the receiver of the coherent optical module; and the calibration unit is configured to determine a calibration mode of the coherent optical module based on the first optical power determined by the determining unit, wherein the calibration method comprises: in a case that the optical power of the receiver of the coherent optical module is in the first range, calibrating the coherent optical module by using the first curve relationship; and in a case that the optical power of the receiver of the coherent optical module is in the second range, calibrating the coherent optical module by using the second curve relationship.

In an alternative embodiment of the present disclosure, the calibration unit is further configured to obtain a plurality of groups of first data satisfying the first curve relationship, then perform a fitting process on the plurality of groups of first data to obtain a first calibration function in the first range; and obtain a plurality of groups of second data satisfying the second curve relationship, then perform a fitting process on the plurality of groups of second data to obtain a second calibration function in the second range.

In an alternative embodiment of the present disclosure, the obtaining unit is further configured to adjust optical power of incident light in the optical power range of the receiver of the coherent optical module, and perform a light splitting process on each adjusted channel of incident light to obtain first incident light and second incident light corresponding to each channel of incident light, wherein the incident light is a channel of light received by the receiver of the coherent light module; obtain optical power of the first incident light corresponding to each channel of incident light; obtain a power-gain monitoring voltage and a target setting voltage of the second incident light corresponding to each channel of incident light; determine the first curve relationship according to the optical power of the first incident light and the power-gain monitoring voltage of the second incident light corresponding to the same channel of incident light; and determine the second curve relationship according to the optical power of the first incident light and the target setting voltage of the second incident light corresponding to the same channel of incident light.

In an alternative embodiment of the present disclosure, the obtaining unit is further configured to perform an attenuation process on optical power of incident light in the optical power range of the receiver of the coherent optical module, and perform a light splitting process on each attenuated channel of incident light to obtain first incident light and second incident light corresponding to each channel of incident light, wherein the incident light is a channel of light received by the receiver of the coherent light module; obtain optical power of the first incident light corresponding to each channel of incident light; obtain a power-gain monitoring voltage and a target setting voltage of the second incident light corresponding to each channel of incident light; determine the first curve relationship according to the optical power of the first incident light and the power-gain monitoring voltage of the second incident light corresponding to the same channel of incident light; and determine the second curve relationship according to the optical power of the first incident light and the target setting voltage of the second incident light corresponding to the same channel of incident light.

In an alternative embodiment of the present disclosure, the apparatus further comprises a processing unit configured to perform an initialization process on the coherent optical module, wherein the initialization process comprises: adjusting the optical power of the receiver of the coherent optical module to an upper limit value of the optical power range of the receiver of the coherent optical module.

Embodiments of the present disclosure further provide a calibration device for a coherent optical module, comprising, a processor and a memory for storing a computer program capable of running on the processor, wherein the processor executes the steps of the method described above when it is used for running the computer program.

Embodiments of the present disclosure further provide a computer-readable storage medium, wherein a computer program is stored on the computer-readable storage medium, and when the computer program is executed by at least one processor, the steps of the method as described above are implemented.

Embodiments of the present disclosure provide a calibration method, apparatus and device for a coherent optical module, and a computer-readable storage medium, wherein the method comprises: obtaining a first curve relationship and a second curve relationship, wherein the first curve relationship represents a relationship between a power-gain monitoring voltage and receiving end optical power in an optical power range of a receiver of the coherent optical module, the power-gain monitoring voltage being used to measure a voltage amplitude output by an integrated coherent receiver of the coherent optical module, and the second curve relationship represents a relationship between a target setting voltage and the optical power of the receiver of the coherent optical module in the optical power range of the receiver of the coherent optical module, the target setting voltage being used for adjusting the voltage amplitude output by the integrated coherent receiver of the coherent optical module; determining first optical power based on the first curve relationship and the second curve relationship, wherein the first optical power is used to divide the optical power range of the receiver of the coherent optical module into two ranges, a first range of the two ranges being greater than a lower limit value of the optical power range of the receiver of the coherent optical module and less than the first optical power, a second range of the two ranges being greater than or equal to the first optical power and less than an upper limit value of the optical power range of the receiver of the coherent optical module; determining a calibration mode of the coherent optical module based on the first optical power, wherein the calibration mode comprises: in a case that the optical power of the receiver of the coherent optical module is in the first range, calibrating the coherent optical module by using the first curve relationship; and in a case that the optical power of the receiver of the coherent optical module is in the second range, calibrating the coherent optical module by using the second curve relationship. In the embodiments of the present disclosure, the first optical power is determined according to the first curve relationship and the second curve relationship, wherein the first optical power is used for dividing the receive optical power range into two ranges, and then the coherent optical module is calibrated by using the first curve relationship in the case that the optical power of the receiver of the coherent optical module is in the first range; and is calibrated by using the second curve relationship in the case that the optical power of the receiver of the coherent optical module is in the second range, wherein the calibration process does not depend on the PD, and a reporting curve obtained in the whole optical power range of the receiver is calibrated through a segmentation function, so that the reporting precision in the whole optical power range is improved.

DETAILED DESCRIPTION

In order to make the objectives, technical solutions and advantages of the embodiments of the present disclosure clearer, specific technical solutions disclosed herein are further described in detail below with reference to drawings of the embodiments of the present disclosure. The following embodiments are intended to illustrate the present disclosure, but are not intended to limit the scope of the present disclosure in any way.

The present disclosure will be further described in detail below with reference to the accompanying drawings and specific embodiments.

Figure 1:
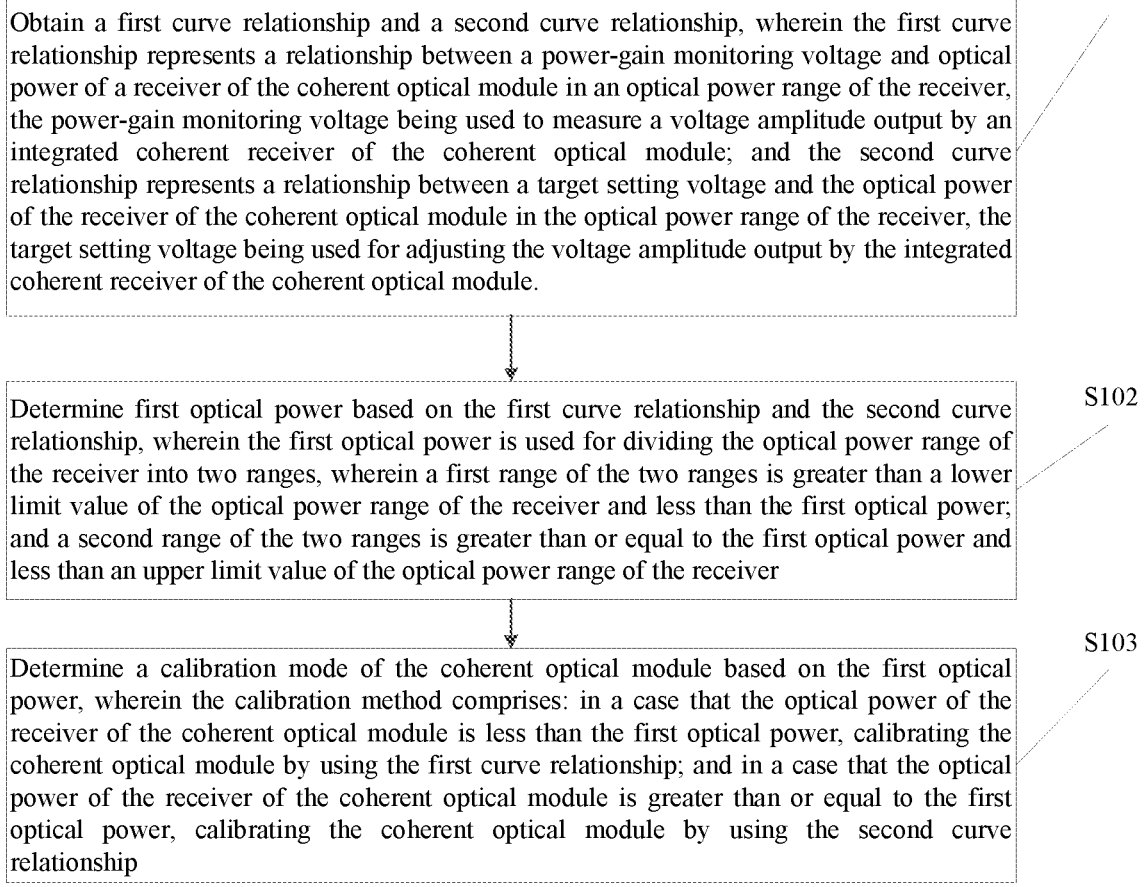
FIG. 1 is a schematic flowchart of a calibration method for a coherent optical module according to an embodiment of the present disclosure.

FIG. 1 shows a schematic flowchart of a calibration method for a coherent optical module provided by an embodiment of the present disclosure. The method comprises:

S101: Obtaining a first curve relationship and a second curve relationship, wherein the first curve relationship represents a relationship between a power-gain monitoring voltage and optical power of a receiver of the coherent optical module in an optical power range of the receiver, the power-gain monitoring voltage being used to measure a voltage amplitude output by an integrated coherent receiver of the coherent optical module; and the second curve relationship represents a relationship between a target setting voltage and the optical power of the receiver of the coherent optical module in the optical power range of the receiver, the target setting voltage being used for adjusting the voltage amplitude output by the integrated coherent receiver of the coherent optical module.

S102: determining first optical power based on the first curve relationship and the second curve relationship, wherein the first optical power is used for dividing the optical power range of the receiver into two ranges, wherein a first range of the two ranges is greater than a lower limit value of the optical power range of the receiver and less than the first optical power; and a second range of the two ranges is greater than or equal to the first optical power and less than an upper limit value of the optical power range of the receiver.

S103: determining a calibration mode of the coherent optical module based on the first optical power, wherein the calibration method comprises: in a case that the optical power of the receiver of the coherent optical module is less than the first optical power, calibrating the coherent optical module by using the first curve relationship; and in a case that the optical power of the receiver of the coherent optical module is greater than or equal to the first optical power, calibrating the coherent optical module by using the second curve relationship.

It shall be noted that the calibration method for the coherent optical module in this embodiment may be a calibration method for reporting of total light and light with a specified wavelength received by the receiver of the coherent optical module, wherein the total light may be synthetic light with different wavelengths; and the light with the specified wavelength may be light having the same frequency as the local oscillator light source of the receiver of the coherent optical module, and the light with the specified wavelength is also referred to as Colorless light.

Figure 2:
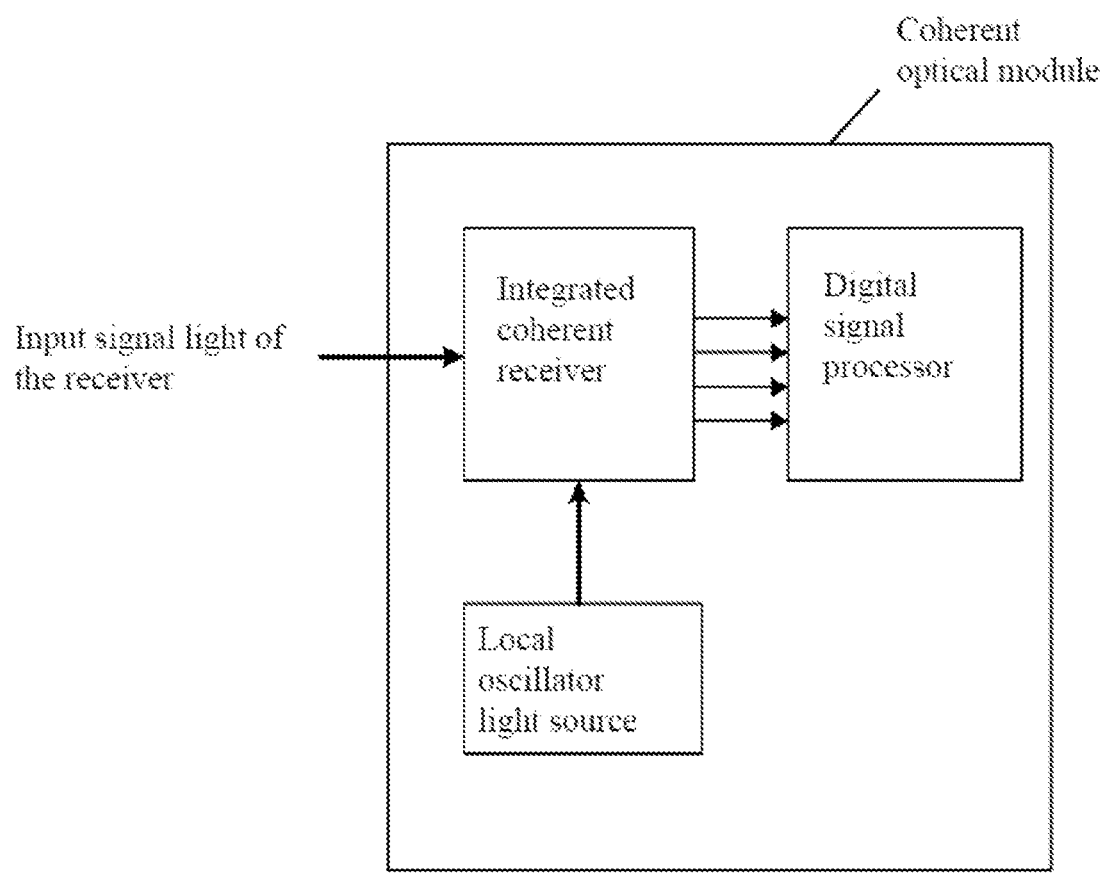
FIG. 2 is a schematic structural diagram of a coherent optical module provided by an embodiment of the present disclosure.

For ease of understanding, here illustrate a schematic structural diagram of a coherent optical module. FIG. 2 is a schematic structural diagram of a coherent optical module provided by an embodiment of the present disclosure. As shown in FIG. 2, the coherent optical module comprises an integrated coherent receiver (ICR), a digital signal processor (DSP), and a local oscillator light source, wherein when the input signal light of the receiver of the coherent optical module has the same frequency as the local oscillator light source of the coherent optical module, the optical signal is converted and demodulated into an electrical signal through an internal mixing and photoelectric conversion by the coherent receiver. An amplitude of the electrical signal may include the useful information carried by the optical signal. The amplitude of the electrical signal needs to match the requirements of the DSP on the input amplitude.

Figure 3:
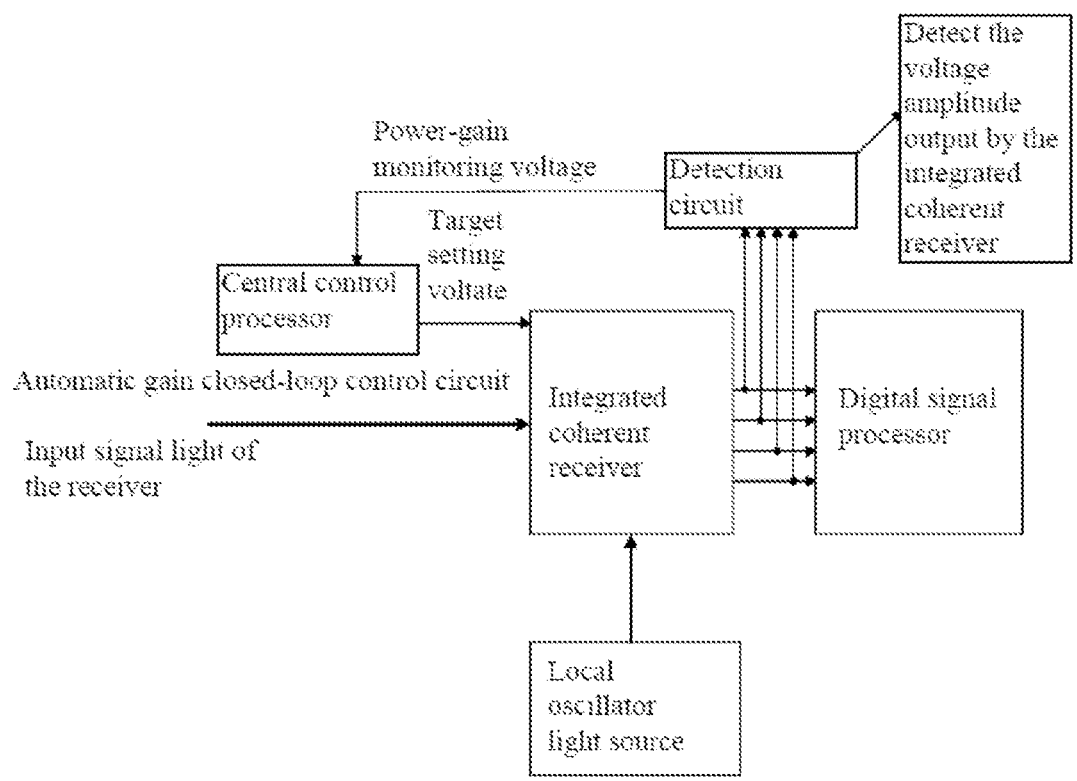
FIG. 3 is a schematic structural diagram of a coherent optical module in an automatic gain control mode according to an embodiment of the present disclosure.

In order to meet that the amplitude of the electrical signal matches the requirements of DSP on the input amplitude, the integrated coherent receiver is generally set to an automatic gain control (AGC) mode. To facilitate understanding, here provides an example of the structural diagram of a coherent optical module in the automatic gain control mode. FIG. 3 is a structural diagram of the coherent optical module in the automatic gain control mode provided by the embodiment of the disclosure. As shown in FIG. 3, in the AGC mode, the detection circuit is used to detect the voltage amplitude output by the integrated coherent receiver. A central control processor timely reads the amplitude value measuring the output voltage of the integrated coherent receiver of the coherent optical module, and compares the amplitude value with the target setting value. If the optical power input to the coherent optical module is too large, the central control processor will reduce the target setting value, so as to reduce the amplitude value of the ICR output voltage; otherwise, the central control processor will increase the target setting value to increase the amplitude value of the ICR output voltage.

It shall be noted that the optical power range of the receiver of the coherent optical module is related to the model or specification of the coherent optical module, and the optical power range of the receiver of the coherent optical module is generally determined when the model or specification of the coherent optical module is determined. For ease of understanding, in a case that the coherent optical module is a single-fiber bi-directional (Bi Di) optical module, the optical power range of the receiver of the coherent optical module may be −22 dBm to +1 dBm.

The terms "first" and "second" as described herein are merely used to distinguish curve relationships, and do not limit the present disclosure. The first curve relationship may be a correspondence between a power-gain monitoring voltage and optical power of a receiver of the coherent optical module in an optical power range of the receiver of the coherent optical module. As an example, the correspondence may be a curve constructed in a coordinate system by a power-gain monitoring voltage and optical power of a receiver of the coherent optical module in an optical power range of the receiver of the coherent optical module. The second curve relationship may be a correspondence between a target setting voltage and the optical power of the receiver of the coherent optical module in the optical power range of the receiver of the coherent optical module. As an example, the correspondence may be a curve constructed in a coordinate system by a target setting voltage and optical power of a receiver of the coherent optical module in an optical power range of the receiver of the coherent optical module.

Determining the first optical power based on the first curve relationship and the second curve relationship may be determining the corresponding first optical power based on an intersection of the first curve relationship and the second curve relationship. The first optical power divides the optical power range of the receiver of the coherent optical module into two ranges, wherein a first range of the two ranges is greater than a lower limit value of the optical power range of the receiver of the coherent optical module and less than the first optical power, and a second range of the two ranges is greater than or equal to the first optical power and less than an upper limit value of the optical power range of the receiver of the coherent optical module; or the first optical power divides the optical power range of the receiver of the coherent optical module into two ranges, wherein a first range of the two ranges is greater than the lower limit value of the optical power range of the receiver of the coherent optical module and less than or equal to the first optical power, and a second range which is greater than the first optical power and less than the upper limit value of the optical power range of the receiver of the coherent optical module. The terms "first" and "second" here are merely used to distinguish the two ranges, and not used to limit the present disclosure.

Figure 4:
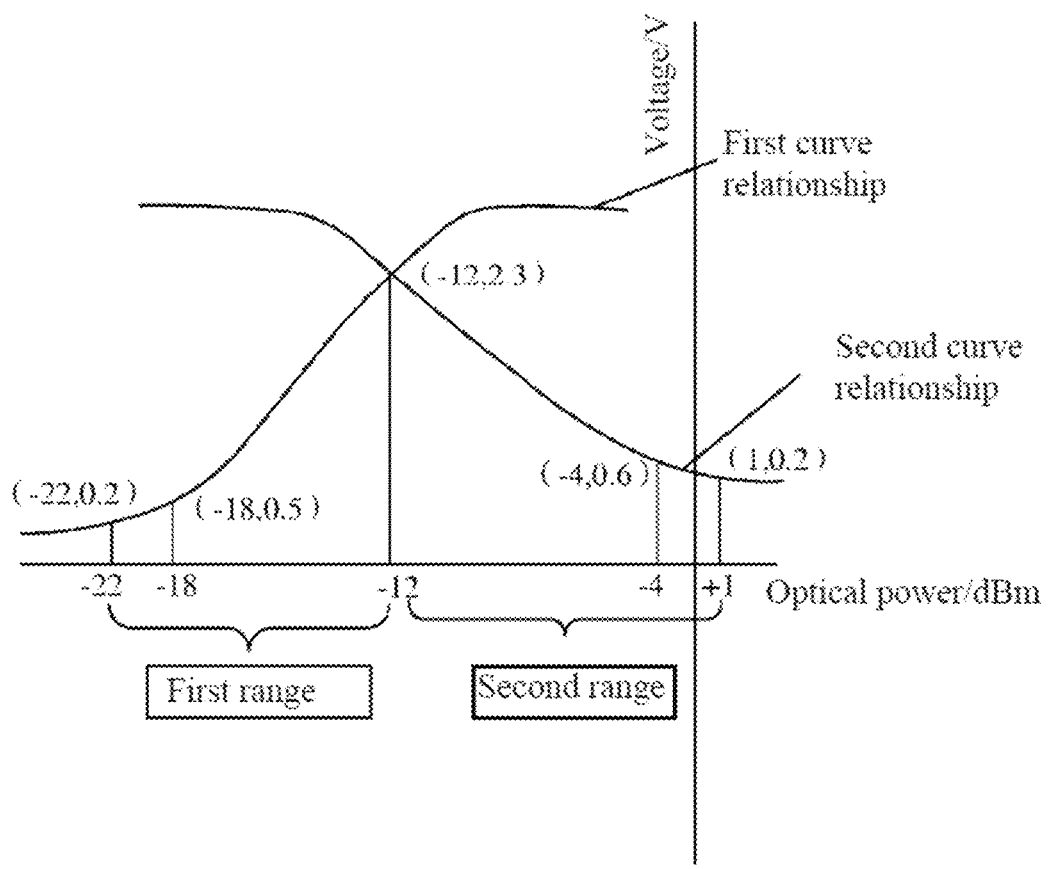
FIG. 4 is a schematic diagram of a first curve relationship and a second curve relationship in a coherent optical module provided by an embodiment of the present disclosure.

To facilitate understanding, here illustrates a schematic diagram of the first curve relationship and the second curve relationship in a coherent optical module. FIG. 4 is a schematic diagram of a first curve relationship and a second curve relationship in a coherent optical module according to an embodiment of the present disclosure. As shown in FIG. 4, a curve between the power-gain monitoring voltage and the optical power of the receiver is constructed in the optical power range of the receiver of the coherent optical module in a coordinate system, and a curve between the target setting voltage and the optical power of the receiver is constructed in the coordinate system in the optical power range of the receiver of the coherent optical module. The coherent optical module is a BiDi optical module, and the optical power range of the receiver of the BiDi optical module is −22 dBm to +1 dBm; that is, the lower limit value of the optical power range of the receiver is −22 dBm, and the upper limit value of the optical power range of the receiver is +1 dBm. There is a unique intersection point between the first curve relationship and the second curve relationship between −22 dBm to +1 dBm, and the optical power corresponding to the unique intersection point is −12 dBm, by which the optical power range of the receiver is divided into two ranges (−22, −12) and [−12, +1), wherein the first range may be (−22, −12) and the second range may be [−12, +1).

Determining the calibration mode of the coherent optical module based on the first optical power may be determining whether the optical power of the receiver of the coherent optical module is less than the first optical power; in a case that the optical power of the receiver of the coherent optical module is less than the first optical power, the coherent optical module is calibrated by using the first curve relationship; and in a case that the optical power of the receiver of the coherent optical module is greater than or equal to the first optical power, the coherent optical module is calibrated by using the second curve relationship. The calibration is to calibrate the relationship between the electrical signal output by the coherent optical module and the input optical power corresponding thereto, so that the input coherent optical power information can be accurately acquired by the electrical signal, corresponding thereto, output by the coherent optical module.

In this embodiment of the present disclosure, the first optical power is determined according to the first curve relationship and the second curve relationship and is used for dividing the optical power range of the receiver of the coherent optical module into two ranges, and then the coherent optical module is calibrated by using the first curve relationship in the case that the optical power of the receiver of the coherent optical module is in the first range; and is calibrated by using the second curve relationship in the case that the optical power of the receiver of the coherent optical module is in the second range. In this way, the calibration process does not depend on the PD, and the reporting curve obtained throughout the whole optical power range of a receiver is calibrated by a segmentation function, so that the reporting precision throughout the whole optical power range is improved.

In an alternative embodiment of the present disclosure, calibrating the coherent optical module by using the first curve relationship comprises: obtaining a plurality of groups of first data satisfying the first curve relationship, and performing a fitting process on the plurality of groups of first data to obtain a first calibration function in the first range; and calibrating the coherent optical module by using the second curve relationship comprises: obtaining a plurality of groups of second data satisfying the second curve relationship, and performing a fitting process on the plurality of groups of second data to obtain a second calibration function in the second range.

It shall be noted that, "a plurality of groups of first data" described herein may be any plurality of groups of data that satisfy the first curve relationship. Performing a fitting process on the plurality of groups of first data to obtain a first calibration function in the first range may be performing a fitting of an n-order polynomial for a plurality of groups of data to obtain a polynomial of n-order polynomial in the first range, where n is greater than or equal to 1. As one example, an n-order polynomial fitting is performed on a plurality of groups of first data to obtain a polynomial of n-order in the first range, where n is greater than or equal to 1; for example, the n-order polynomial fitting may be a third-order polynomial fitting or a fourth-order polynomial fitting, for example, $y=Ax^3+Bx^2+Cx+D$ (here A is not equal to zero) or $y=Ax^4+Bx^3+Cx^2+Dx+E$ (here A is not equal to zero). In the case that the n-order polynomial fitting is a third-order polynomial fitting, at least three groups of first data satisfying the first curve relationship may be obtained; and the three groups of first data are substituted into the third-order polynomial for fitting to obtain corresponding coefficients A, B, C and D, and further a first calibration function in the first range, which is stored in the coherent optical module. In the case that the n-order polynomial fitting is a fourth-order polynomial fitting, at least four groups of first data satisfying the first curve relationship may be obtained; and the four groups of first data are substituted into the fourth-order polynomial for fitting to obtain corresponding coefficients A, B, C, D and E, and further a first calibration function in the first range. As an example, the first range may be (−22, −12).

As used herein, "a plurality of groups of second data" may be any plurality of groups of data that satisfy the second curve relationship. Performing a fitting process on the plurality of groups of second data to obtain a second calibration function in the second range may be performing an n-order polynomial fitting on the plurality of groups of second data to obtain an n-order polynomial in the second range, where n is greater than or equal to 1. As an example, an n-order polynomial fitting is performed on a plurality of groups of second data to obtain a polynomial of n-order in the second range, where n is greater than or equal to 1; for example, the n-order polynomial fitting may be a third-order polynomial fitting or a fourth-order polynomial fitting, for example, $y=Ax^3+Bx^2+Cx+D$ (A is not equal to zero) or $y=Ax^4+Bx^3+Cx^2+Dx+E$ (A is not equal to zero). In the case that the n-order polynomial fitting is a third-order polynomial fitting, at least three groups of second data satisfying the second curve relationship may be obtained; and the three groups of second data are substituted into the third-order polynomial for fitting to obtain corresponding coefficients A, B, C and D, and further a second calibration function in the second range. In the case that the n-order polynomial fitting is a fourth-order polynomial fitting, at least four groups of second data satisfying the second curve relationship may be obtained; and the four groups of second data are substituted into the fourth-order polynomial for fitting to obtain corresponding coefficients A, B, C, D and E, and further a first calibration function in the second range. As an example, the second range may be [−12, +1).

In this embodiment of the present disclosure, a plurality of groups of first data satisfying the first curve relationship are obtained; a fitting process is performed on the plurality of groups of first data to obtain a first calibration function in the first range; a plurality of groups of second data satisfying the second curve relationship are obtained; and a fitting process is performed on the plurality of groups of second data to obtain a second calibration function in the second range. As a result, the calibration process does not depend on the PD, and the reporting curve obtained in the whole optical power range of a receiving end is calibrate by using a segmentation function, so that the reporting precision in the whole optical power range is improved.

In an alternative embodiment of the present disclosure, obtaining the first curve relationship and the second curve relationship comprises: adjusting optical power of incident light in the optical power range of the receiver of the coherent optical module, and performing a light splitting process on each adjusted channel of incident light to obtain first incident light and second incident light corresponding to each channel of incident light, wherein the incident light is a channel of light received by the receiver of the coherent light module; obtaining optical power of the first incident light corresponding to each channel of incident light; obtaining a power-gain monitoring voltage and a target setting voltage of the second incident light corresponding to each channel of incident light; determining the first curve relationship according to the optical power of the first incident light and the power-gain monitoring voltage of the second incident light corresponding to the same channel of incident light; and determining the second curve relationship according to the optical power of the first incident light and the target setting voltage of the second incident light corresponding to the same channel of incident light.

It shall be noted that in the embodiments of the present disclosure, the adjusting process of the optical power of the incident light may be adjusting the transmit optical power of the incident light, so that the optical power of the channel of light received by the receiver of the coherent optical module changes in the optical power range of the receiver of the coherent optical module. Here, adjusting the transmit optical power of the incident light may be adjusting the transmit optical power of the light source.

Performing a light splitting process on each adjusted channel of incident light to obtain the first incident light and the second incident light corresponding to each channel of incident light may be inputting each adjusted channel of incident light into an optical splitter to obtain the first incident light and the second incident light corresponding to each channel of incident light. The optical splitter is configured to input half (50%) of the adjusted channel of incident light (i.e., the first incident light corresponding to each channel of incident light) into an optical power meter, so as to conveniently obtain the optical power of the first incident light corresponding to each channel of incident light; and to input half (50%) of the adjusted channel of incident light (i.e., the second incident light corresponding to each channel of incident light) into the coherent optical module, so as to obtain a power-gain monitoring voltage and a target setting voltage of the second incident light corresponding to each channel of incident light.

Determining the first curve relationship according to the optical power of the first incident light and the power-gain monitoring voltage of the second incident light corresponding to the same channel of incident light may be understood as that since the optical power of the first incident light is the same as the optical power of the second incident light, the optical power of the first incident light, that is, the optical power of the second incident light, may be directly read by means of the optical power meter; a corresponding relationship between each optical power and a power-gain monitoring voltage corresponding to the same optical power is determined by reading the optical power of the first incident light and the power-gain monitoring voltage of the second incident light respectively through the optical power meter, and the first curve relationship is constructed according to the plurality of corresponding relationships. As an example, the optical power of the first incident light and the power-gain monitoring voltage of the second incident light read each time by the optical power meter may form coordinates so as to obtain a plurality of groups of coordinates, and the plurality of groups of coordinates are traced in a coordinate system to construct the first curve relationship.

Determining the second curve relationship according to the optical power of the first incident light and the target setting voltage of the second incident light corresponding to the same channel of incident light may be understood as that since the optical power of the first incident light is the same as the optical power of the second incident light, the optical power of the first incident light, that is, the optical power of the second incident light, may be directly read by means of the optical power meter; a corresponding relationship between each optical power and a target setting voltage corresponding to the same optical power is determined according to the optical power of the first incident light and the target setting voltage of the second incident light respectively through the optical power meter, and the second curve relationship is constructed according to the plurality of corresponding relationships. As an example, the optical power of the first incident light and the target setting voltage of the second incident light read each time by the optical power meter may form coordinates so as to obtain a plurality of groups of coordinates, and the plurality of groups of coordinates are traced in a coordinate system to construct the second curve relationship.

Figure 5A:
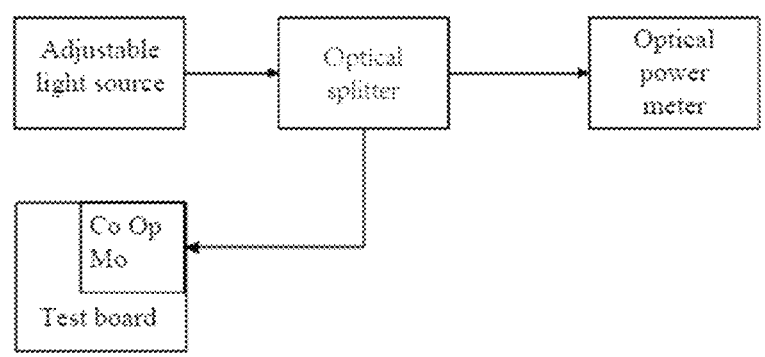
FIGS. 5A, 5B, and 5B are schematic structural diagram of a calibration by a coherent optical module provided by an embodiment of the present disclosure.
Figure 5B:
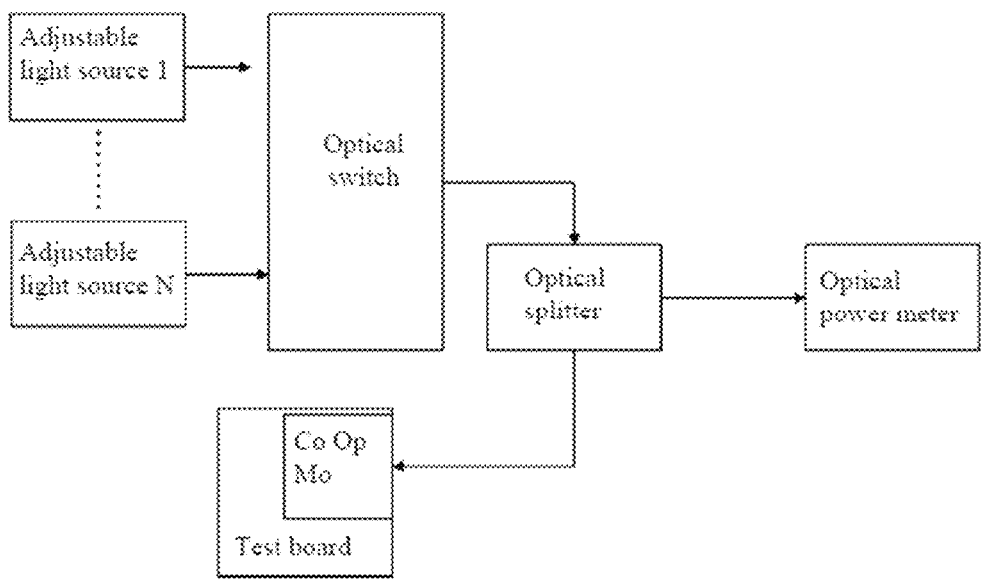
Figure 5C:
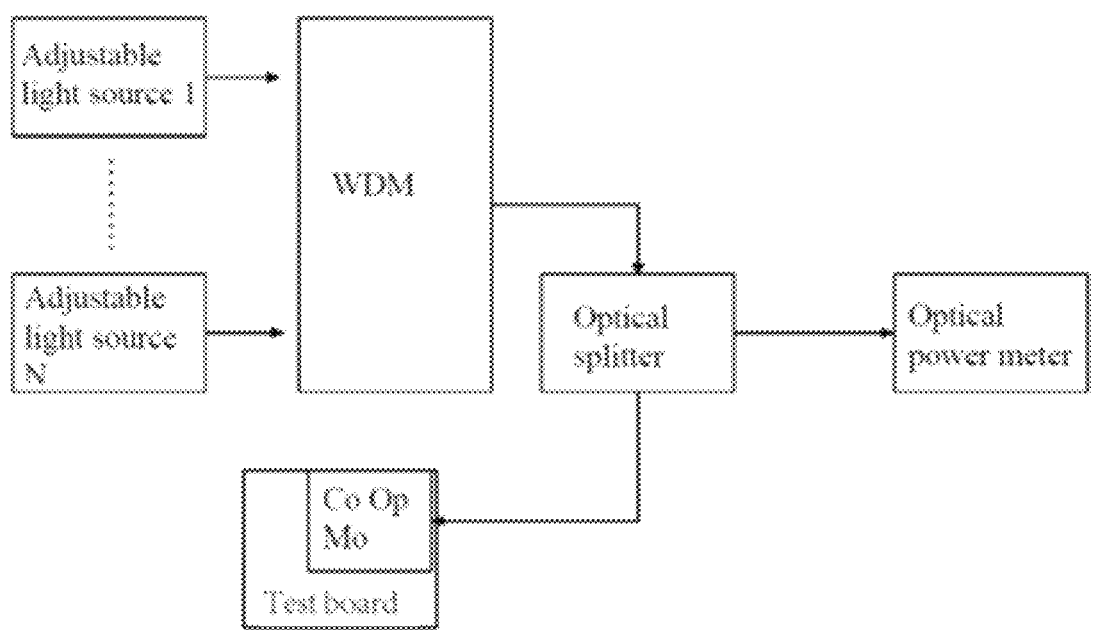

In practical application, in order to facilitate understanding, here illustrates a schematic structural diagram of calibrating a coherent optical module. FIG. 5 is a schematic structural diagram of calibrating a coherent optical module provided according to an embodiment of the present disclosure. As shown in FIGS. 5A, 5B, and 5C, the transmit optical power of the adjustable light source is required to be adjusted, and each adjusted channel of incident light enters the optical splitter to obtain the first incident light and the second incident light corresponding to each channel of incident light; then the first incident light enters into an optical power meter so as to read the optical power corresponding to the first incident light; and the second incident light enters into a coherent optical module, so as to obtain a power-gain monitoring voltage and a target setting voltage corresponding to the second incident light; then the first curve relationship is determined according to the optical power of the first incident light and the power-gain monitoring voltage of the second incident light corresponding to the same channel of incident light; and then the second curve relationship is determined according to the optical power of the first incident light and the target setting voltage of the second incident light corresponding to the same channel of incident light.

In FIGS. 5B and 5C, light with different wavelengths may be emitted by the adjustable light source 1 to the adjustable light source N, and the light with different wavelengths is transmitted to the coherent optical module and is referred to as the total light of the receiver of the coherent optical module, and further the coherent optical module searches the light with the same frequency of the local oscillator light source of the coherent optical module, that is, Colorless light.

In an alternative embodiment of the present disclosure, obtaining the first curve relationship and the second curve relationship comprises: performing an attenuation process on optical power of incident light in the optical power range of the receiver of the coherent optical module, and performing a light splitting process on each attenuated channel of incident light to obtain first incident light and second incident light corresponding to each channel of incident light, wherein the incident light is a channel of light received by the receiver of the coherent light module; obtaining optical power of the first incident light corresponding to each channel of incident light; obtaining a power-gain monitoring voltage and a target setting voltage of the second incident light corresponding to each channel of incident light; determining the first curve relationship according to the optical power of the first incident light and the power-gain monitoring voltage of the second incident light corresponding to the same channel of incident light; and determining the second curve relationship according to the optical power of the first incident light and the target setting voltage of the second incident light corresponding to the same channel of incident light.

It shall be noted that in this embodiment of the present disclosure, the attenuation process of the optical power of the incident light may be an operation of adjusting the optical attenuation amount by means of the variable optical attenuator (VOA), so as to achieve the purpose of automatically adjusting the optical power, so that the optical power of the channel of light received by the receiver of the coherent optical module changes in the optical power range of the receiver of the coherent optical module.

Performing the light splitting process on each attenuated channel of incident light to obtain the first incident light and the second incident light corresponding to each channel of incident light may be inputting each adjusted channel of incident light into an optical splitter to obtain the first incident light and the second incident light corresponding to each channel of incident light. The light splitter is used to input half (50%) of each adjusted channel of incident light (i.e. the first incident light corresponding to each channel of incident light) into an optical power meter to facilitate obtaining the optical power of the first incident light corresponding to each channel of incident light; and to input half (50%) of each adjusted channel of incident light (that is, the second incident light corresponding to each channel of incident light) into the coherent light module to facilitate obtaining the power-gain monitoring voltage and the target setting voltage of the second incident light corresponding to each channel of incident light.

Determining the first curve relationship according to the optical power of the first incident light and the power-gain monitoring voltage of the second incident light corresponding to the same channel of incident light may be understood as that since the optical power of the first incident light is the same as the optical power of the second incident light, the optical power of the first incident light, that is, the optical power of the second incident light, may be directly read by means of the optical power meter; a corresponding relationship between each optical power and a power-gain monitoring voltage corresponding to the same optical power is determined by reading the optical power of the first incident light and the power-gain monitoring voltage of the second incident light respectively through the optical power meter, and the first curve relationship is constructed according to the plurality of corresponding relationships. As an example, the optical power of the first incident light and the power-gain monitoring voltage of the second incident light read each time by the optical power meter may form coordinates to obtain a plurality of groups of coordinates, and the plurality of groups of coordinates are traced in a coordinate system to construct the first curve relationship.

Determining the second curve relationship according to the optical power of the first incident light and the target setting voltage of the second incident light corresponding to the same channel of incident light may be understood as that since the optical power corresponding to the first incident light is the same as the optical power corresponding to the second incident light, the optical power corresponding to the first incident light, that is, the optical power corresponding to the second incident light, may be directly read by means of the optical power meter; a corresponding relationship between each optical power and a target setting voltage corresponding to the same optical power is determined according to the optical power of the first incident light and the target setting voltage of the second incident light respectively through the optical power meter, and the second curve relationship is constructed according to the plurality of corresponding relationships. As an example, the optical power corresponding to the first incident light and the target setting voltage corresponding to the second incident light read each time by the optical power meter may form coordinates to obtain a plurality of groups of coordinates, and the plurality of groups of coordinates are traced in a coordinate system to construct the second curve relationship.

Figure 6:
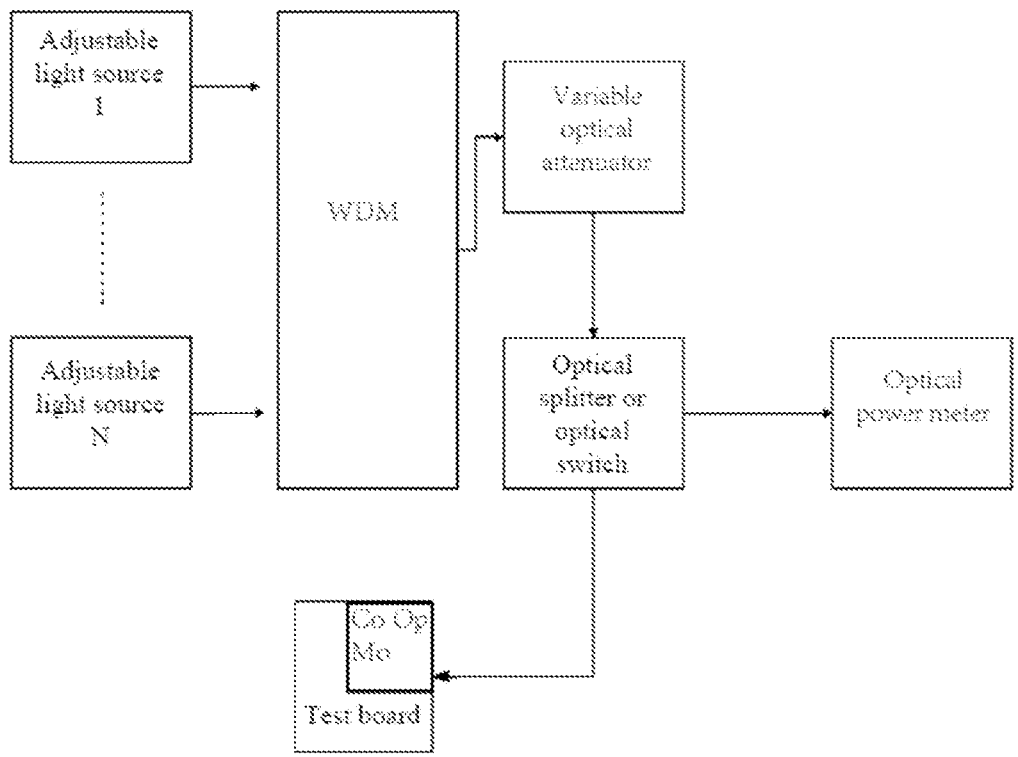
FIG. 6 is another schematic structural diagram of a calibration by a coherent optical module provided by an embodiment of the present disclosure.

In practical application, in order to facilitate understanding, here illustrates another schematic structural diagram of a coherent optical module for calibration. FIG. 6 is a schematic structural diagram of calibrating a coherent optical module provided according to an embodiment of the present disclosure. As shown in FIG. 6, an operation of adjusting a light attenuation amount through a variable optical attenuator is required, and each attenuated channel of incident light enters an optical splitter to obtain first incident light and second incident light corresponding to each channel of incident light; then the first incident light enters an optical power meter so as to read the optical power of the first incident light; and the second incident light enters a coherent optical module, so as to obtain a power-gain monitoring voltage and a target setting voltage of the second incident light corresponding to each channel of incident light; then the first curve relationship is determined according to the optical power of the first incident light and the power-gain monitoring voltage of the second incident light corresponding to the same channel of incident light; and the second curve relationship is determined according to the optical power of the first incident light and the target setting voltage of the second incident light corresponding to the same channel of incident light.

In FIG. 6, light with different wavelengths may be emitted by the adjustable light source 1 to the adjustable light source N, and the light with different wavelengths is transmitted to the coherent optical module and is referred to as the total light of the receiver of the coherent optical module, and the coherent optical module further searches light with the same frequency as the local oscillator light source of the coherent optical module, that is, Colorless light.

In an alternative embodiment of the present disclosure, before obtaining the first curve relationship and the second curve relationship, the method further comprises: initializing the coherent optical module, wherein the initialization process comprises: adjusting the optical power of the receiver of the coherent optical module to an upper limit value of the optical power range of the receiver of the coherent optical module.

It shall be noted that in the embodiments of the present disclosure, the initialization process on the coherent optical module may be adjusting the optical power of the receiver of the coherent optical module to the upper limit value of the optical power range of the receiver by adjusting VOA, so that the coherent optical module is configured and powered to operate normally.

In this embodiment of the present disclosure, the first optical power is determined according to the first curve relationship and the second curve relationship, and the first optical power is used for dividing the receive optical power range into two ranges, i.e. a first range and a second range, and then the coherent optical module is calibrated by using the first curve relationship in the case that the optical power of the receiver of the coherent optical module is in the first range; and is calibrated by using the second curve relationship in the case that the optical power of the receiver of the coherent optical module is in the second range. As a result, the calibration process does not depend on the PD, and a reporting curve obtained in the whole receive optical power range is calibrated through a segmentation function, so that the reporting precision in the whole optical power range is improved.

Figure 7:
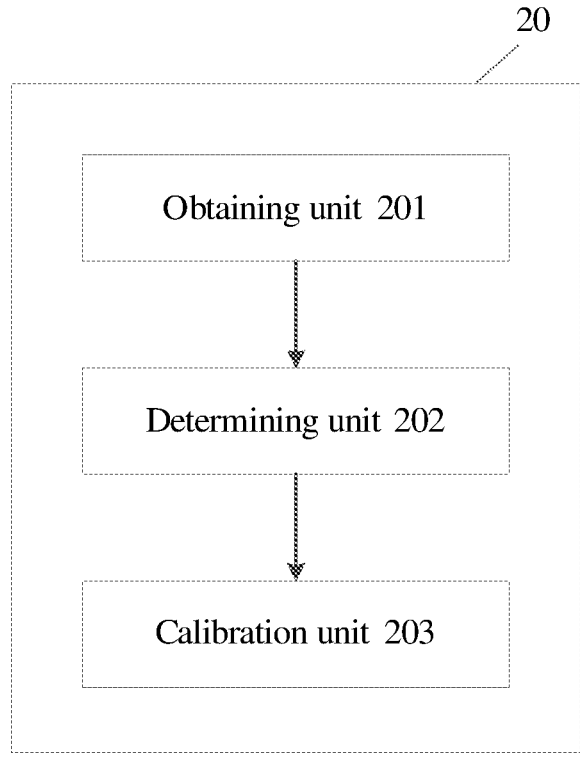
FIG. 7 is a schematic structural diagram of a calibration apparatus for a coherent optical module according to an embodiment of the present disclosure.

Based on the same disclosure concept, FIG. 7 is a schematic structural diagram of a calibration apparatus for a coherent optical module provided by an embodiment of the present disclosure. As shown in FIG. 7, the apparatus 20 comprises an obtaining unit 201, a determining unit 202, and a calibration unit 203.

The obtaining unit 201 is configured to obtain a first curve relationship and a second curve relationship, wherein the first curve relationship represents a relationship between a power-gain monitoring voltage and optical power of a receiver of the coherent optical module in an optical power range of the receiver of the coherent optical module, the power-gain monitoring voltage being used for measuring a voltage amplitude output by an integrated coherent receiver of the coherent optical module; and the second curve relationship represents a relationship between a target setting voltage and the optical power of the receiver of the coherent optical module in the optical power range of the receiver of the coherent optical module, the target setting voltage being used for adjusting the voltage amplitude output by the integrated coherent receiver of the coherent optical module.

The determining unit 202 is configured to determine first optical power based on the first curve relationship and the second curve relationship obtained by the obtaining unit, wherein the first optical power is used to divide the optical power range of the receiver of the coherent optical module into two ranges, a first range of which is greater than a lower limit value of the optical power range of the receiver and less than the first optical power; and a second range of which is greater than or equal to the first optical power and less than an upper limit value of the optical power range of the receiver.

The calibration unit 203 is configured to determine a calibration mode of the coherent optical module based on the first optical power determined by the determining unit, wherein the calibration method comprises: in the case that the optical power of the receiver of the coherent optical module is in the first range, calibrating the coherent optical module by using the first curve relationship; and in the case that the optical power of the receiver of the coherent optical module is in the second range, calibrating the coherent optical module by using the second curve relationship.

In some embodiments, the calibration unit 203 is further configured to obtain a plurality of groups of first data satisfying the first curve relationship; perform a fitting process on the plurality of groups of first data to obtain a first calibration function in the first range; obtain a plurality of groups of second data satisfying the second curve relationship; and perform a fitting process on the plurality of groups of second data to obtain a second calibration function in the second range.

In some embodiments, the obtaining unit 201 is further configured to adjust optical power of incident light in the optical power range of the receiver of the coherent optical module, and perform a light splitting process on each adjusted incident light to obtain first incident light and second incident light corresponding to each channel of incident light, wherein the incident light is a channel of light received by the receiver of the coherent light module; obtain optical power of the first incident light corresponding to each channel of incident light; obtain a power-gain monitoring voltage and a target setting voltage of the second incident light corresponding to each channel of incident light; determine the first curve relationship according to the optical power of the first incident light and the power-gain monitoring voltage of the second incident light corresponding to the same channel of incident light; and determine the second curve relationship according to the optical power of the first incident light and the target setting voltage of the second incident light corresponding to the same channel of incident light.

In some embodiments, the obtaining unit 201 is further configured to perform an attenuation process on optical power of incident light in the optical power range of the receiver of the coherent optical module, and perform a light splitting process on each attenuated channel of incident light to obtain first incident light and second incident light corresponding to each channel of incident light, wherein the incident light is a channel of light received by the receiver of the coherent light module; obtain optical power of the first incident light corresponding to each channel of incident light; obtain a power-gain monitoring voltage and a target setting voltage of the second incident light corresponding to each channel of incident light; determine the first curve relationship according to the optical power of the first incident light and the power-gain monitoring voltage of the second incident light corresponding to the same channel of incident light; and determine the second curve relationship according to the optical power of the first incident light and the target setting voltage of the second incident light corresponding to the same channel of incident light.

In some embodiments, the apparatus 20 further comprises a processing unit configured to perform an initialization process on the coherent optical module, wherein the initialization process comprises: adjusting the optical power of the receiver of the coherent optical module to an upper limit value of the optical power range of the receiver of the coherent module.

Embodiments of the present disclosure provide a calibration apparatus for a coherent optical module, which is also used for determining first optical power by means of a first curve relationship and a second curve relationship, wherein the first optical power is used for dividing the optical power range of the receiver of the coherent optical module into two ranges, and then, in the case that the optical power of the receiver of the coherent optical module is in the first range, calibrating the coherent optical module by using the first curve relationship; and in the case that the optical power of the receiver of the coherent optical module is in the second range, calibrating the coherent optical module by using the second curve relationship. As a result, the calibration process does not depend on the PD, and a reporting curve obtained in the whole optical power range of a receiver is calibrated through a segmentation function, so that the reporting precision in the whole optical power range is improved. Some terms regarding the calibration apparatus for the coherent optical module have been explained in the calibration method for the coherent optical module, and thus details thereof are not repeated herein.

The present disclosure provides a computer readable medium having a computer program stored thereon, wherein the computer program, when executed by a processor, implements the steps of the foregoing method embodiments. The foregoing storage medium comprises various media that may store program codes, such as a mobile storage device, a read-only memory (ROM), a random access memory (RAM, Random Access Memory), a magnetic disk, or an optical disc.

Embodiments of the present disclosure further provide a calibration device for a coherent optical module, comprising: a processor and a memory for storing a computer program capable of running on the processor, wherein the processor is used for executing the steps of the method embodiments stored in the memory when running the computer program.

Figure 8:
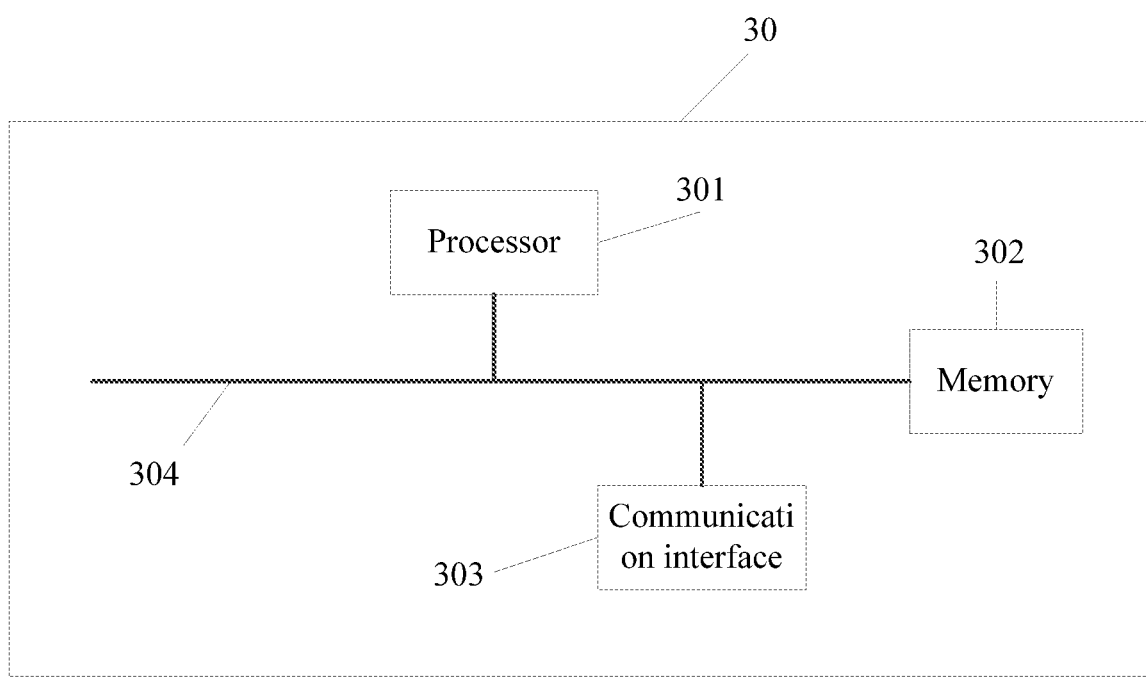
FIG. 8 is a schematic diagram of a hardware structure of a calibration device for a coherent optical module according to an embodiment of the present disclosure.

FIG. 8 is a schematic diagram of a hardware structure of a calibration device for a coherent optical module according to an embodiment of the present disclosure. The calibration device 30 for the coherent optical module comprises: at least a processor 301 and a memory 302. Optionally, the calibration device 30 for the coherent optical module may further include at least a communication interface 303. Each component of the calibration device 30 for the coherent optical module may be coupled together by using a bus system 304. It can be understood that the bus system 304 is configured to implement connection communication between these components. In addition to including the data bus, the bus system 304 further comprises a power bus, a control bus, and a state signal bus. However, for clarity of illustration, various buses are marked as bus system 304 in FIG. 8.

It can be understood that the memory 302 may be a volatile memory or a non-volatile memory, or may include both a volatile and non-volatile memory. The non-volatile memory may be a read-only memory (ROM), a programmable read-only memory (PROM), an erasable programmable read-only memory (EPROM), an electrically erasable programmable read-only memory (EEPROM), a magnetic random access memory (FRAM), a flash memory, a magnetic surface memory, an optical disc, or a read-only optical disc (CD-ROM, Compact Disc Read-Only Memory), wherein the magnetic surface memory may be a magnetic disk memory or a magnetic tape memory. The volatile memory may be a random access memory (RAM), which is used as an external cache. By way of example, but not limitation, many forms of RAM are available, such as a static random access memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 302 described in the embodiments of the present disclosure is intended to include, but is not limited to, these and any other suitable type of memory.

The memory 302 in the embodiments of the present disclosure is configured to store various types of data to support the operation of the calibration device 30 for the coherent optical module. Examples of these data include: any computer program for operating on the calibration device 30 for the coherent optical module, for example, obtaining a mileage range for determining that there is a defect in the tunnel lining to be detected based on the first image and the second image, etc. and a program for implementing the method of the embodiments of the present disclosure may be included in the memory 302.

The method disclosed in the embodiments of the present disclosure may be applied to the processor 301 or implemented by the processor 301. The processor 301 may be an integrated circuit chip having a signal processing capability. In an implementation process, the steps of the foregoing method may be completed by an integrated logic circuit of hardware in the processor 301 or instructions in a form of software. The processor 301 may be a general-purpose processor, a digital signal processor (DSP), or other programmable logic devices, discrete gates or transistor logic devices, discrete hardware components, and the like. The processor 301 may implement or perform the methods, steps, and logical block diagrams disclosed in the embodiments of the present disclosure. The general-purpose processor may be a microprocessor or any conventional processor or the like. The steps of the method disclosed in the embodiments of the present disclosure may be directly executed by a hardware decoding processor, or implemented by combining hardware in a decoding processor and a software module. The software module may be located in a storage medium which is located in the memory 302, and the processor 301 reads information in the memory and completes the steps of the foregoing method in combination with hardware of the processor 301.

In an exemplary embodiment, the calibration device 30 for the coherent optical module may be applied to one or more application specific integrated circuits (ASICs), DSPs, programmable logic devices (PLD), complex programmable logic devices (CPLD), field-programmable gate arrays (FPGA), general-purpose processors, controllers, micro controller unit (MCU), a microprocessor, or other electronic components, to perform the above-mentioned method.

In the several embodiments provided in this application, it shall be understood that the disclosed apparatus and method may be implemented in other manners. The apparatus embodiments described above are merely illustrative, for example, the division of the units is merely a logical function division. There may be another division manner during actual implementation; for example, multiple units or components may be combined, or may be integrated into another system, or some features may be ignored, or not performed. In addition, the coupling, or direct coupling, or communication connection between the shown or discussed components may be indirect coupling or communication connection through some interfaces, devices, or units, and may be electrical, mechanical, or other forms.

The units described as separate components may or may not be physically separate, and the components displayed as units may be, or may not be physical units; that is, they may be located in one place or may be distributed in multiple network units; some or all of the units may be selected according to actual needs to achieve the objectives of the solutions of the embodiments.

In addition, the functional units in the embodiments of the present disclosure may all be integrated into one processing unit, or each of the units may be separately used as a unit, or two or more units may be integrated into one unit; the integrated unit may be implemented in the form of hardware, or may be implemented in the form of a hardware plus software functional unit.

A person of ordinary skill in the art may understand that all or some of the steps of implementing the foregoing method embodiments may be completed by hardware related to program instructions, and the foregoing program may be stored in a computer-readable storage medium, and when executed, the program executes the steps including the foregoing method embodiments; and the foregoing storage medium comprises various media that can store program codes, such as a mobile storage device, a read-only memory (ROM), a random access memory (RAM, Random Access Memory), a magnetic disk, or an optical disc.

Alternatively, if the integrated unit of the present disclosure is implemented in the form of a software functional module and sold or used as an independent product, the integrated unit may also be stored in a computer-readable storage medium. Based on such understanding, the technical solution of the embodiments or the parts which contributes to the prior art of the present disclosure may be embodied in the form of a software product, and the computer software product is stored in a storage medium, and comprises several instructions for enabling a computer device (which may be a personal computer, a server, or a network device, etc.) to perform all or part of the methods described in the embodiments of the present disclosure. The foregoing storage medium comprises various media that can store program codes, such as a mobile storage device, a ROM, a RAM, a magnetic disk, or an optical disc.

The foregoing is merely specific embodiments of the present disclosure, but the scope of protection of the present disclosure is not limited thereto, and changes or replacements which could be conceived of by any person skilled in the art may easily in the technical scope disclosed in the present disclosure shall be covered in the scope of protection of the present disclosure. Therefore, the protection scope of the present disclosure shall be subject to the protection scope of the claims.

What is claimed is:

1. A calibration method for a coherent optical module, wherein the method comprises:
obtaining a first curve relationship and a second curve relationship, wherein the first curve relationship represents a relationship between a power-gain monitoring voltage and optical power of a receiver of the coherent optical module in an optical power range of the receiver of the coherent optical module, the power-gain monitoring voltage being used to measure a voltage amplitude output by an integrated coherent receiver of the coherent optical module, and the second curve relationship represents a relationship between a target setting voltage and the optical power of the receiver of the coherent optical module in the optical power range of the receiver of the coherent optical module, the target setting voltage being used for adjusting the voltage amplitude output by the integrated coherent receiver of the coherent optical module;

determining first optical power based on the first curve relationship and the second curve relationship, wherein the first optical power is used to divide the optical power range of the receiver into two ranges, a first range of which is greater than a lower limit value of the optical power range of the receiver and less than the first optical power, and a second range of which is greater than or equal to the first optical power and less than an upper limit value of the optical power range of the receiver; and determining a calibration mode of the coherent optical module based on the first optical power, wherein the calibration mode comprises: in a case that the optical power of the receiver of the coherent optical module is in the first range, calibrating the coherent optical module by using the first curve relationship; and in a case that the optical power of the receiver of the coherent optical module is in the second range, calibrating the coherent optical module by using the second curve relationship.

2. The method according to claim 1, wherein the calibrating the coherent optical module by using the first curve relationship comprises:
obtaining a plurality of groups of first data satisfying the first curve relationship;
performing a fitting process on the plurality of groups of first data to obtain a first calibration function in the first range;
and wherein the calibrating the coherent optical module by using the second curve relationship comprises:
obtaining a plurality of groups of second data satisfying the second curve relationship; and
performing a fitting process on the plurality of groups of second data to obtain a second calibration function in the second range.

3. The method according to claim 1, wherein the obtaining the first curve relationship and the second curve relationship comprises:
adjusting optical power of incident light in the optical power range of the receiver of the coherent optical module, and performing a light splitting process on each adjusted channel of incident light to obtain first incident light and second incident light corresponding to each channel of incident light, wherein the incident light is a channel of light received by the receiver of the coherent optical module;
obtaining optical power of the first incident light corresponding to each channel of incident light;
obtaining a power-gain monitoring voltage and a target setting voltage of the second incident light corresponding to each channel of incident light;
determining the first curve relationship according to the optical power of the first incident light and the power-gain monitoring voltage of the second incident light corresponding to the same channel of incident light; and
determining the second curve relationship according to the optical power of the first incident light and the target setting voltage of the second incident light corresponding to the same channel of incident light.

4. The method according to claim 1, wherein the obtaining the first curve relationship and the second curve relationship comprises:
performing an attenuation process on optical power of incident light in the optical power range of the receiver of the coherent optical module, and performing a light splitting process on each attenuated channel of incident light to obtain first incident light and second incident light corresponding to each channel of incident light, wherein the incident light is a channel of light received by the receiver of the coherent optical module;
obtaining optical power of the first incident light corresponding to each channel of incident light;
obtaining a power-gain monitoring voltage and a target setting voltage of the second incident light corresponding to each channel of incident light;
determining the first curve relationship according to the optical power of the first incident light and the power-gain monitoring voltage of the second incident light corresponding to the same channel of incident light; and
determining the second curve relationship according to the optical power of the first incident light and the target setting voltage of the second incident light corresponding to the same channel of incident light.

5. The method according to claim 1, wherein before the obtaining the first curve relationship and the second curve relationship, the method further comprises:
performing an initialization process on the coherent optical module, wherein the initialization process comprises: adjusting the optical power of the receiver of the coherent optical module to an upper limit value of the optical power range of the receiver of the coherent optical module.

6. A calibration device for an optical module, comprising a processor and a memory configured to store a computer program capable of being executed on the processor, wherein the processor is configured to execute steps of a calibration method for a coherent optical module when running the computer program,
wherein the calibration method comprises:
obtaining a first curve relationship and a second curve relationship, wherein the first curve relationship represents a relationship between a power-gain monitoring voltage and optical power of a receiver of the coherent optical module in an optical power range of the receiver of the coherent optical module, the power-gain monitoring voltage being used to measure a voltage amplitude output by an integrated coherent receiver of the coherent optical module, and the second curve relationship represents a relationship between a target setting voltage and the optical power of the receiver of the coherent optical module in the optical power range of the receiver of the coherent optical module, the target setting voltage being used for adjusting the voltage amplitude output by the integrated coherent receiver of the coherent optical module;
determining first optical power based on the first curve relationship and the second curve relationship, wherein the first optical power is used to divide the optical power range of the receiver into two ranges, a first range of which is greater than a lower limit value of the optical power range of the receiver and less than the first optical power, and a second range of which is greater than or equal to the first optical power and less than an upper limit value of the optical power range of the receiver; and determining a calibration mode of the coherent optical module based on the first optical power, wherein the calibration mode comprises: in a case that the optical power of the receiver of the coherent optical module is in the first range, calibrating the coherent optical module by using the first curve relationship; and in a case that the optical power of the receiver of the coherent optical module is in the second range, calibrating the coherent optical module by using the second curve relationship.

7. The calibration device for an optical module according to claim 6, wherein the calibrating the coherent optical module by using the first curve relationship comprises:
obtaining a plurality of groups of first data satisfying the first curve relationship;
performing a fitting process on the plurality of groups of first data to obtain a first calibration function in the first range;
and wherein the calibrating the coherent optical module by using the second curve relationship comprises:
obtaining a plurality of groups of second data satisfying the second curve relationship; and
performing a fitting process on the plurality of groups of second data to obtain a second calibration function in the second range.

8. The calibration device for an optical module according to claim 6, wherein the obtaining the first curve relationship and the second curve relationship comprises:
adjusting optical power of incident light in the optical power range of the receiver of the coherent optical module, and performing a light splitting process on each adjusted channel of incident light to obtain first incident light and second incident light corresponding to each channel of incident light, wherein the incident light is a channel of light received by the receiver of the coherent optical module;
obtaining optical power of the first incident light corresponding to each channel of incident light;
obtaining a power-gain monitoring voltage and a target setting voltage of the second incident light corresponding to each channel of incident light;
determining the first curve relationship according to the optical power of the first incident light and the power-gain monitoring voltage of the second incident light corresponding to the same channel of incident light; and
determining the second curve relationship according to the optical power of the first incident light and the target setting voltage of the second incident light corresponding to the same channel of incident light.

9. The calibration device for an optical module according to claim 6, wherein the obtaining the first curve relationship and the second curve relationship comprises:
performing an attenuation process on optical power of incident light in the optical power range of the receiver of the coherent optical module, and performing a light splitting process on each attenuated channel of incident light to obtain first incident light and second incident light corresponding to each channel of incident light, wherein the incident light is a channel of light received by the receiver of the coherent optical module;
obtaining optical power of the first incident light corresponding to each channel of incident light;
obtaining a power-gain monitoring voltage and a target setting voltage of the second incident light corresponding to each channel of incident light;
determining the first curve relationship according to the optical power of the first incident light and the power-gain monitoring voltage of the second incident light corresponding to the same channel of incident light; and
determining the second curve relationship according to the optical power of the first incident light and the target setting voltage of the second incident light corresponding to the same channel of incident light.

10. The calibration device for an optical module according to claim 6, wherein before the obtaining the first curve relationship and the second curve relationship, the method further comprises:
performing an initialization process on the coherent optical module, wherein the initialization process comprises: adjusting the optical power of the receiver of the coherent optical module to an upper limit value of the optical power range of receiver of the coherent optical module.

11. A computer-readable storage medium, on which a computer program is stored, wherein steps of a calibration method for a coherent optical module are implemented when the computer program is executed by at least one processor, wherein the calibration method comprises:
obtaining a first curve relationship and a second curve relationship, wherein the first curve relationship represents a relationship between a power-gain monitoring voltage and optical power of a receiver of the coherent optical module in an optical power range of the receiver of the coherent optical module, the power-gain monitoring voltage being used to measure a voltage amplitude output by an integrated coherent receiver of the coherent optical module, and the second curve relationship represents a relationship between a target setting voltage and the optical power of the receiver of the coherent optical module in the optical power range of the receiver of the coherent optical module, the target setting voltage being used for adjusting the voltage amplitude output by the integrated coherent receiver of the coherent optical module;
determining first optical power based on the first curve relationship and the second curve relationship, wherein the first optical power is used to divide the optical power range of the receiver into two ranges, a first range of which is greater than a lower limit value of the optical power range of the receiver and less than the first optical power, and a second range of which is greater than or equal to the first optical power and less than an upper limit value of the optical power range of the receiver; and
determining a calibration mode of the coherent optical module based on the first optical power, wherein the calibration mode comprises: in a case that the optical power of the receiver of the coherent optical module is in the first range, calibrating the coherent optical module by using the first curve relationship; and in a case that the optical power of the receiver of the coherent optical module is in the second range, calibrating the coherent optical module by using the second curve relationship.

12. The computer-readable storage medium according to claim 11, wherein the calibrating the coherent optical module by using the first curve relationship comprises:
obtaining a plurality of groups of first data satisfying the first curve relationship;

performing a fitting process on the plurality of groups of first data to obtain a first calibration function in the first range;

and wherein the calibrating the coherent optical module by using the second curve relationship comprises:

obtaining a plurality of groups of second data satisfying the second curve relationship; and performing a fitting process on the plurality of groups of second data to obtain a second calibration function in the second range.

13. The computer-readable storage medium according to claim 11, wherein the obtaining the first curve relationship and the second curve relationship comprises:

adjusting optical power of incident light in the optical power range of the receiver of the coherent optical module, and performing a light splitting process on each adjusted channel of incident light to obtain first incident light and second incident light corresponding to each channel of incident light, wherein the incident light is a channel of light received by the receiver of the coherent optical module;

obtaining optical power of the first incident light corresponding to each channel of incident light;

obtaining a power-gain monitoring voltage and a target setting voltage of the second incident light corresponding to each channel of incident light;

determining the first curve relationship according to the optical power of the first incident light and the power-gain monitoring voltage of the second incident light corresponding to the same channel of incident light; and determining the second curve relationship according to the optical power of the first incident light and the target setting voltage of the second incident light corresponding to the same channel of incident light.

14. The computer-readable storage medium according to claim 11, wherein the obtaining the first curve relationship and the second curve relationship comprises:

performing an attenuation process on optical power of incident light in the optical power range of the receiver of the coherent optical module, and performing a light splitting process on each attenuated channel of incident light to obtain first incident light and second incident light corresponding to each channel of incident light, wherein the incident light is a channel of light received by the receiver of the coherent optical module;

obtaining optical power of the first incident light corresponding to each channel of incident light;

obtaining a power-gain monitoring voltage and a target setting voltage of the second incident light corresponding to each channel of incident light;

determining the first curve relationship according to the optical power of the first incident light and the power-gain monitoring voltage of the second incident light corresponding to the same channel of incident light; and determining the second curve relationship according to the optical power of the first incident light and the target setting voltage of the second incident light corresponding to the same channel of incident light.

15. The computer-readable storage medium according to claim 11, wherein before the obtaining the first curve relationship and the second curve relationship, the method further comprises:

performing an initialization process on the coherent optical module, wherein the initialization process comprises: adjusting the optical power of the receiver of the coherent optical module to an upper limit value of the optical power range of receiver of the coherent optical module.

* * * * *